(No Model.)
E. H. SCOTT.
METHOD OF MAKING METAL WHEELS.
No. 478,644. Patented July 12, 1892.
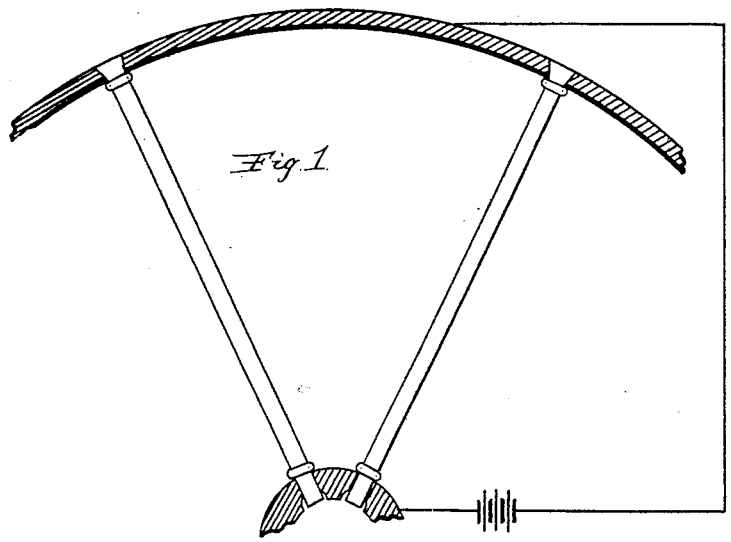
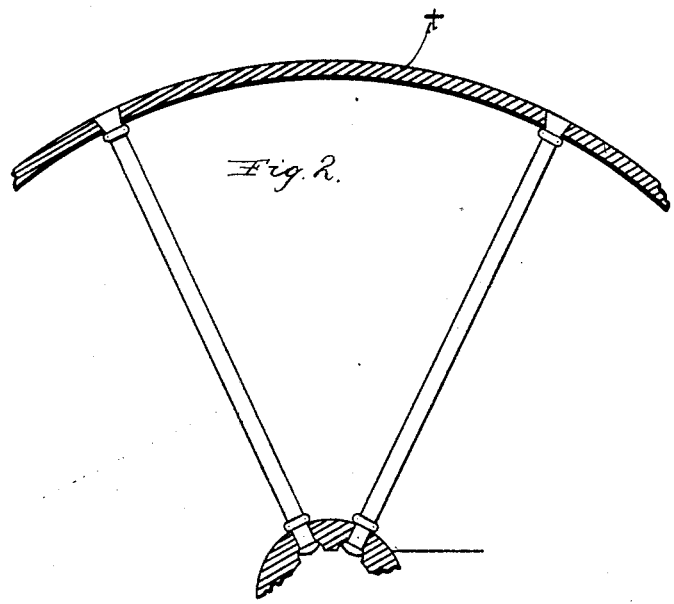
Witnesses:
Mack A. Claflin.
H. M. Munday
Inventor:
Emmet H. Scott.
By Munday Evarts & Adcock
his Attorneys.

UNITED STATES PATENT OFFICE.

EMMET H. SCOTT, OF LA PORTE, INDIANA, ASSIGNOR TO THE NILES & SCOTT COMPANY, OF SAME PLACE.

METHOD OF MAKING METAL WHEELS.

SPECIFICATION forming part of Letters Patent No. 478,644, dated July 12, 1892.

Application filed January 28, 1889. Serial No. 297,782. (No specimens.)

*To all whom it may concern:*

Be it known that I, EMMET H. SCOTT, a citizen of the United States, residing in La Porte, in the county of La Porte and State of Indiana, have invented a new and useful Improvement in the Art of Making Metal Wheels, of which the following is a specification.

My invention relates to the process or method of securing the metal spokes of metal wheels in the metallic hub of the wheel.

The invention relates more particularly to securing the spokes to the hubs of that class of metal wheels wherein the hub ends of the spokes are riveted, bent, or upset after being inserted in the hub for the purpose of fixing them rigidly therein. Wheels of this class are illustrated, for example, in patents to Seymour, No. 394,885, or Bettendorf, Nos. 325,585, 374,575, and 386,572.

The object of my invention is to facilitate the riveting, upsetting, or bending operation, and at the same time produce a more rigid and perfect union or joint between the several spokes and the hub than it has heretofore been possible to produce.

In my process the spokes are all first rigidly secured or riveted to or in the metallic rim of the wheel and the inner ends of the spokes inserted in place in the hub. The rim of the wheel is then clamped in a suitable clamping device to bring the rim to a true circle about the axis of the hub, and the spokes are next heated by an electric current in the same manner as is done in the well-known process of electric welding, and, finally, the ends of the spokes are riveted, bent, upset, or otherwise manipulated while thus heated to rigidly secure them in place in the hub. The riveting, bending, or upsetting operation may be done by hand or by suitable machines or devices known to those skilled in the art. If the spokes are secured by riveting, a spoke-riveting machine, such as that shown and described in the patents to Bettendorf, Nos. 335,882 and 384,604, may be employed. The degree to which the ends of the spokes are heated by the electric current during the riveting, bending, or upsetting operation may be varied without departing from the principle of my invention, and preferably the heat may be raised to the fusing or welding point, so that in addition to the ordinary riveting or upsetting operation a welding or fusing of the metal of the spoke and hub together will take place, so that each and every spoke will be united with perfect rigidity to the hub. The first part of the process—viz., the riveting of the spokes first in place in the rim and inserting them in the hub and then clamping or forcing the rim of the wheel in the form of a true circle about the axis of the hub—is, in effect, the same as that shown and described in the patent to Zimmerman, No. 392,252, and this part of my present process is now well known to those skilled in the art.

In the accompanying drawings, forming a part of this specification, I have shown at Figure 1 a sectional view of the hub, showing the spoke in place ready for heating and riveting; and Fig. 2 is a similar view after the riveting operation has been completed.

I claim—

1. The improvement in the art or process of making metallic wheels, consisting in first securing the spokes rigidly in the metal rim of the wheel and inserting them in place in the hub, then forcing or clamping the rim of the wheel to a true circle about the axis of the hub, then heating the hub end of the spokes by an electric current, and, finally, while the spokes are so heated riveting, bending, upsetting, or otherwise manipulating the ends of the spokes and securing them rigidly in or to the hub, substantially as specified.

2. The improvement in the art or process of making metallic wheels, consisting in first securing the spokes rigidly in the metal rim of the wheel and inserting them in place in the hub, then forcing or clamping the rim of the wheel to a true circle about the axis of the hub, then heating the ends of the spokes by an electric current to the fusing or welding point, and, finally, subjecting the ends of the spokes to force or pressure while so heated to unite them with the hub, substantially as specified.

3. The improvement in the art or process of manufacturing metal wheels, consisting in heating the ends of the spokes after they are inserted in the hub by an electric current and then subjecting the same to force or pressure to bend, rivet, or unite the same while so heated to the hub, substantially as specified.

4. The improvement in the art or process of making metallic wheels, consisting in first securing the spokes rigidly in the metal rim of the wheel and inserting them in place in the hub, then forcing or clamping the rim of the wheel to a true circle about the axis of the hub, then heating the hub ends of the spokes, and, finally, while the spokes are so heated riveting, bending, upsetting, or otherwise manipulating the ends of the spokes and securing them in or to the hub, substantially as specified.

5. The improvement in the art of attaching metal spokes to metal wheel-hubs, consisting in introducing the end of the spoke into the other member, heating the contiguous portions of the two members to a welding temperature by directing an electric current therethrough, and, finally, upsetting the spoke to complete the welding operation.

6. The improvement in the art of manufacturing metal wheels, consisting in introducing the ends of the spokes into mortises in the hub, heating the contiguous parts to a welding temperature by directing an electric current therethrough, and, finally, forcing the parts into contact while thus heated to effect a welded union between them.

EMMET H. SCOTT.

Witnesses:
J. VENE DORLAND,
WILLIAM TYRRELL.